United States Patent [19]

Aisa et al.

[11] Patent Number: 4,959,997
[45] Date of Patent: Oct. 2, 1990

[54] MAGNETIC FLOAT FOR MAGNETIC SENSOR

[75] Inventors: Junzo Aisa; Mituo Yamamoto, both of Shizuoka, Japan

[73] Assignee: Ishikawa Tekko Kabushiki Kaisha, Tokyo, Japan

[21] Appl. No.: 363,128

[22] Filed: Jun. 8, 1989

[30] Foreign Application Priority Data

Oct. 26, 1988 [JP] Japan .................................. 63-270310

[51] Int. Cl.⁵ ............................................. H01H 35/18
[52] U.S. Cl. .................................. 73/308; 200/84 C; 340/450.2; 335/303
[58] Field of Search ................ 73/322.5, DIG. 5, 308, 73/306; 335/303; 200/84 C; 340/624

[56] References Cited

U.S. PATENT DOCUMENTS

| | | | |
|---|---|---|---|
| 3,112,730 | 12/1963 | Inscho, Jr. | 73/322.5 X |
| 3,202,173 | 8/1965 | Szwargulski | 73/322.5 X |
| 3,270,770 | 9/1966 | Wilson | 73/322.5 X |
| 3,555,905 | 1/1971 | George | 73/322.5 X |
| 3,868,485 | 2/1975 | Sykes et al. | 73/322.5 X |
| 4,549,157 | 10/1985 | Loubier | 335/303 |
| 4,631,375 | 12/1986 | McCann | 200/84 C |

Primary Examiner—Daniel M. Yasich
Attorney, Agent, or Firm—Nilles & Nilles

[57] ABSTRACT

A magnetic float for a magnetic sensor wherein magnetized magnetic powder is dispersed into a foamed synthetic resin, and the magnetic flux thereof acts on a reed switch in the magnetic sensor to turn on or off the reed switch. The magnetic powder is substantially wholly coated with the synthetic resin.

7 Claims, 2 Drawing Sheets

MAGNETIC FLOAT FOR MAGNETIC SENSOR

BACKGROUND OF THE INVENTION

1. Field of the Invention

The present invention relates to a magnetic float for a magnetic sensor such as a reed switch in a level meter or the like which is turned on or off as the magnetic float moves up and down.

2. Description of the Prior Art

In a level meter for detecting the residual quantity (or presence) of the brake oil of an automobile, for example, a reed switch and a magnetic float are used such that the reed switch is attached to a guide of a pipe or the like and that an annular magnetic float is movably disposed around the guide. As the magnetic float floating at the liquid surface moves up and down along the guide in accordance with the change in the liquid surface, the reed switch is turned on and off.

The conventional magnetic float used in such level meter is constructed, as shown in FIG. 5, by combining a sintered magnet 1 having a larger specific gravity with a float 2 of a foamed synthetic resin having a smaller specific gravity. The float 2 of a foamed synthetic resin is integrally molded by inserting an annular sintered magnet 1 in a die and injecting a mixture of a synthetic resin such as nylon, polypropyrene or acrylonitrile-butadiene rubber and a foaming agent to the outside of the sintered magnet 1 to foam the mixture.

This magnetic float of the prior art is produced by the insert molding process, in which the sintered magnet 1 is inserted into the die, so that its production is complicated to raise the production cost. From the standpoint of performance, the sintered magnet 1 is exposed to the outside and is liable to be corroded by the liquid and to damage the surfaces of other parts.

In case, moreover, the conventional magnetic float is to be used together with the reed switch as the level meter, iron powder 3 or the like contained in the liquid will stick to the sintered magnet 1 to reduce the internal diameter of the magnetic float, as shown in FIG. 6, because the sintered magnet 1 having a high density of surface magnetic flux is exposed to the inner side of the magnetic float, i.e., the guide side of the pipe or the like equipped with the reed switch. This makes it necessary to make the internal diameter b of the magnetic float sufficiently larger than the external diameter a of the guide such as the guide equipped with the reed switch so that the magnetic float is large-sized. Accordingly, the level meter is large-sized to make the level meter expensive and to widen the space for mounting the level meter.

Since, moreover, the sintered magnet 1 has a large specific gravity, the size of the float 2 has to be enlarged the more as the size of the sintered magnet 1 is enlarged. In case, therefore, it is difficult to enlarge the sintered magnet 1, and in case the residual quantity (or presence) of oil having a small specific gravity is to be detected, as shown in FIG. 7, the sintered magnet 1 has its shown vertical thickness t reduced to 3 to 4 mm. As a result, when the sintered magnet 1 is moved up and down relative to a reed, switch 6, the ON range (i.e., a distance between points in which the reed switch 6 is turned on and off) of the reed switch 6 is narrowed so that the position of each reed switch 6 has to be adjusted for producing the level meter.

Specifically, when the reed switch 6 is to be turned on by the sintered magnet 1, the magnetic flux coming from the shown vertical magnetic poles (having an N pole at its upper portion and an S pole at its lower portion) of the sintered magnet 1 acts upon outer end portions of contact members 7 and 8 of the reed switch 6 (i.e., the upper end portion of the upper contact member 7 and the lower end portion of the lower contact member 8) so that the respective two outer end portions of the contact members 7 and 8 are polarized to the S and N poles, whereby inner end portions of the contact members 7 and 8 (i.e., the lower end portion of the upper contact member 7 and the upper end portion of the lower contact member 8) attract each other to establish a conduction. If the sintered magnet 1 has a small thickness t, the distances from the magnetic poles of the sintered magnet 1 and the outer end portions of the contact members 7 and 8 are elongated because the internal diameter b of the sintered magnet 1 is sufficient. Even if the surface densities of the magnetic fluxes of the magnetic poles of the sintered magnet 1 are high, the densities of the magnetic fluxes at the outer end portions of the contact members 7 and 8 are drastically reduced to narrow the range in which the reed switch 6 is turned on by the sintered magnet 1. As a result, unless the position of each reed switch 6 is adjusted when the level meter is to be produced, a malfunction may arise. Thus, it is necessary to adjust the position of each reed switch 6.

Since the magnetic float for the magnetic sensor of the prior art has problems in the production process and in the performances, as has been described hereinbefore, it is difficult to drop the production cost, and other problems arise in the durability and the magnetic characteristics in case the magnetic float is to be assembled in the product such as the level meter together with the magnetic sensor such as the reed switch.

SUMMARY OF THE INVENTION

The present invention has been conceived in view of the points thus far described and contemplates to produce a magnetic float for a magnetic sensor easily at a low cost and to improve the durability and the magnetic characteristics in case the magnetic float is to be assembled together with the magnetic sensor such as the reed switch into a product such as the level meter.

A magnetic float for a magnetic sensor according to the present invention contains magnetic powder in a foamed synthetic resin, and the magnetic powder is magnetized.

In the magnetic float for the magnetic sensor according to the present invention, the magnetic powder is dispersed in the foamed synthetic resin so that the magnetic float has a magneticism in its entirety, and the magnetic powder is substantially wholly coated with the synthetic resin.

The other objects and features of the present invention will become apparent from the following description taken with reference to the accompanying drawings.

BRIEF DESCRIPTION OF THE DRAWINGS

FIG. 1 is a longitudinal section showing a level meter;

FIG. 2 is a longitudinal section showing the magnetic float; and

FIGS. 3 and 4 are longitudinal sections for describing the operations of the magnetic float, respectively.

DESCRIPTION OF THE PREFERRED EMBODIMENTS

An embodiment of a magnetic float for a magnetic sensor according to the present invention will be described in the following with reference to FIGS. 1 to 4.

Figure 1:
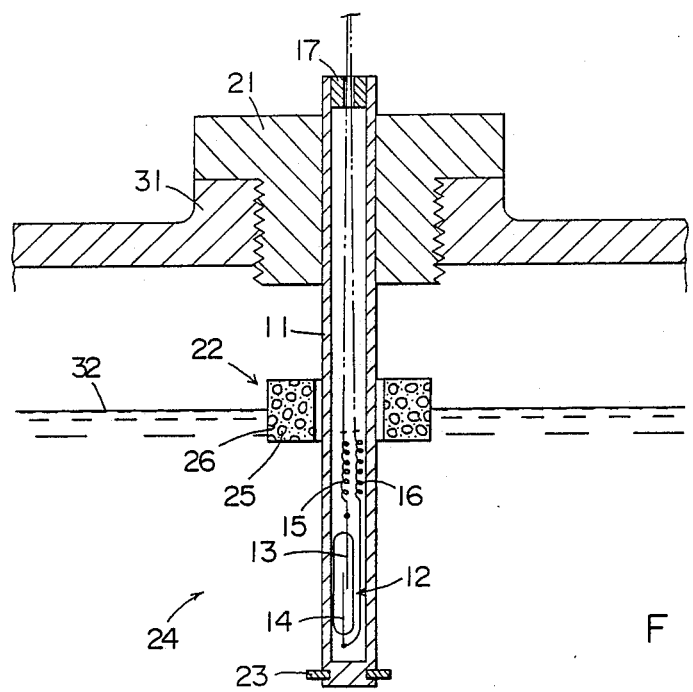
In FIGS. 1 to 4 showing an embodiment of a magnetic float for a magnetic sensor according to the present invention.

In FIG. 1 showing a level meter, reference numeral 11 designates a bottomed cylindrical guide tube, which is equipped in its bottom with a reed switch 12 as the magnetic sensor. This reed switch 12 has its contact members 13 and 14 connected with lead wires 15 and 16, respectively. These lead wires 15 and 16 are led out to the outside through a cap 17 fitted gas-tight in an opening of the guide tube 11.

Moreover, open one end portion of the guide tube 11 fitting the cap 17 is inserted into and fixed gas-tight in the center of a bolt member 21. Into the other outer end portion of the guide tube 11, there is movably fitted an annular magnetic float 22 which has a smaller outer diameter than the thread diameter of the bolt member 21. A stop ring 23 is fixed on the other end portion of the guide tube 11 to prevent the magnetic float 22 from coming out of the guide tube 11 while allowing the magnetic float 22 to move between the bolt member 21 and the stop ring 23, thus constructing a level meter 24.

Figure 2:
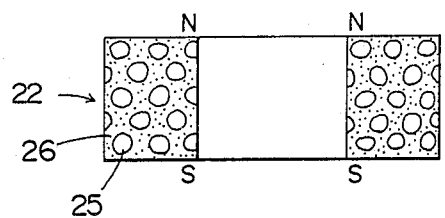

The magnetic float 22 of the level meter 24 contains magnetic powder 26 in a foamed synthetic resin 25, as shown in FIG. 2. The magnetic powder 26 is dispersed in the foamed synthetic resin 25 and is magnetized in the vertical direction so that vertical magnetic poles are established in the magnetic float 22.

Moreover, the level meter 24 is set by arranging both the end portion of the guide tube 11 at the side of the reed switch 12 and the magnetic float 22 upright in a level detecting position through an internally threaded portion 31, which is formed in the top plate or cover of a tank relative to the level detecting position, and by screwing the bolt member 21 in the internally threaded portion 31. Thus, the magnetic float 22 floating in the level of a liquid 32 is moved up and down along the guide tube 11 in accordance with the movement of the liquid level so that the reed switch 12 is turned on and off. If, in this case, the liquid 32 is reduced to move the magnetic float 22 downward, the reed switch 12 is switched from OFF to ON states.

On the other hand, the magnetic float 22 used in this level meter 24 can be easily produced by injecting the mixture of the synthetic resin and the magnetic powder 26 into a die having a predetermined shape to foam the mixture.

Moreover, the magnetic float 22 thus produced has its substantially whole magnetic powder 26 coated with the foamed synthetic resin 25, excepting its limited portion exposed to the surface. If, therefore, the material of the synthetic resin is suitably selected, the magnetic float 22 is free from being corroded by the liquid 32 so that it can have an excellent durability.

Figure 3:
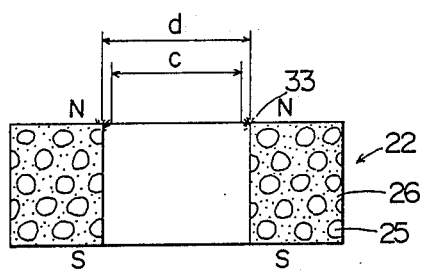

Still moreover, the magnetic float 22 has a lower density of surface magnetic flux for the same total magnetic flux than that of the sintered magnet 1 of the prior art because it is made of a resin-bonded magnet in which the magnetic powder 26 is dispersed in the foamed synthetic resin 25. As shown in FIG. 3, therefore, less iron powder 33 or the like contained in the liquid 32 will stick so that the internal diameter of the magnetic float 22 is hardly be reduced by the iron powder 33 or the like. This makes it possible to reduce the size of the magnetic float 22 and accordingly the level meter 24. As a result, the level meter 24 can be produced at a reasonable cost while reducing its space.

Figure 4:
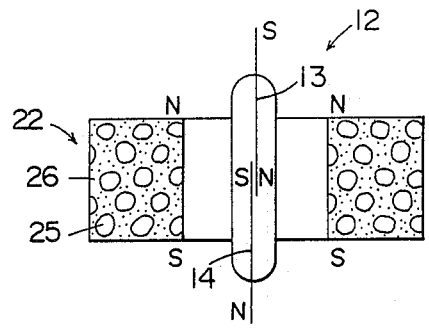
Figure 5:
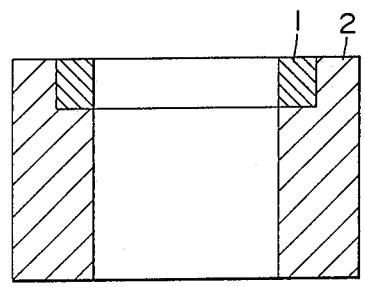
FIG. 5 is a longitudinal section showing a magnetic float of the prior art.
Figure 6:
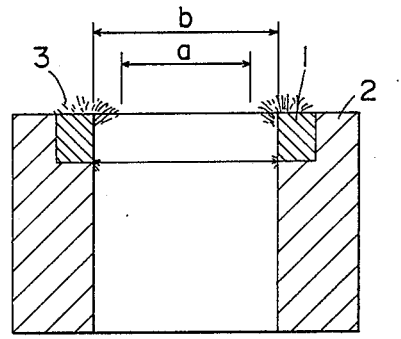
FIGS. 6 and 7 are longitudinal sections for describing the operations of the problems of the magnetic float of the prior art, respectively.
Figure 7:
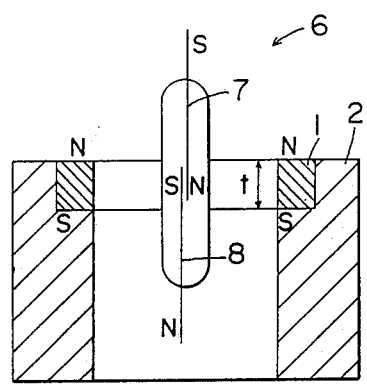

In the case of this magnetic float 22, on the other hand, the magnetic fluxes of the magnetic poles (i.e., the upper N pole and the lower S pole) of the shown vertical magnetic poles of the magnetic float 22 act upon the outer end portions of the contact members 13 and 14 (i.e., the upper end portion of the upper contact member 13 and the lower end portion of the lower contact member 14) of the reed, switch 12, as shown in FIG. 4, so that the two end portions of the individual contact members 13 and 14 are polarized to the S and N poles. As a result, the inner end portions of the contact members 13 and 14 (i.e., the lower end portion of the upper contact member 13 and the upper end portion of the lower contact member 14) attract each other to establish the conduction. The distances from the magnetic poles of the magnetic float 22 to the outer end portions of the contact members 13 and 14 are shorter than those of the sintered magnet 1 of the prior art. Thus, even if the surface densities of the magnetic fluxes of the magnetic poles of the magnetic float 22 are low, the densities of the magnetic fluxes at the outer end portions of the contact members 13 and 14 are hardly reduced so that the range (i.e., a distance from the switching point from the OFF to ON states to the point from the ON to OFF states) in which the reed switch 12 is turned on by the magnetic float 22 is widened. As a result, even if the position of each reed switch 12 is not adjusted when the level meter 24 is to be produced, no malfunction may hardly arise so that the no position adjustment of each reed switch 12 is required.

Incidentally, the magnetic float 22 to be produced has a surface density of magnetic flux of about 60 to 160 Gauss and a bulk specific gravity as low as 0.7 to 0.85.

In order to operate the reed switch 12 of the general purpose type magnetic sensor in current use, a sufficient surface density of magnetic flux for the magnetic float 22 is about 60 to 100 Gauss, although depending upon the accuracy of the reed switch 12. It is, therefore, possible to change the bulk specific gravity by changing the mixing ratio of the synthetic resin and the magnetic material or by changing the foaming degree. This change is advantageous in that the level meter 24 can be used for liquids 32 having a variety of specific gravities.

Incidentally, for practical purposes, the synthetic resin can be suitably selected in conformity with the properties of the liquid, and the magnetic material can be suitably selected from anisotropic or isotropic magnetic materials or rare earth metals.

Since the magnetic float for the magnetic sensor according to the present invention requires no insert molding, as has been described hereinbefore, it can be easily produced in a massive scale and at a reasonable cost. Since, moreover, the magnetic powder is coated with the synthetic resin, the magnetic float has an excellent durability and excellent magnetic properties when assembled together with the magnetic sensor such as the reed switch into the product of the level meter.

What is claimed is:

1. In a magnet float for a magnetic sensor having a guide tube for guiding the magnetic float, a reed switch mounted in said guide tube, and a lead wire for the reed switch led out to the outside through said guide tube, the improvement characterized by comprising said float magnet being formed of a foamed member of synthetic resin including therein a magnetic powder, said magnetic powder being magnetized.

2. The magnetic float according to claim 1, wherein a surface density of magnetic flux thereof is about 60 to 160 Gauss, and a bulk specific gravity thereof is as low as 0.7 to 0.85.

3. A magnetic float for a fluid level meter having a cylindrical guide tube, a reed switch inserted within said guide tube, a lead wire connected to said reed switch and led outside of said guide tube, a bolt member having a threaded diameter, and said guide tube having one end portion inserted into and fixed gas-tight in said bolt member and having a stop ring fixed on the other end portion, said magnetic float comprising:

an annular body disposable around said guide tube and moveable along said guide tube between said bolt member and said stop ring, said body having an outer diameter smaller than said threaded diameter of said bolt member;

said body comprising magnetic powder in a foamed synthetic resin, said magnetic powder being dispersed so that said magnetic float has a magnetism in its entirety, and so that said magnetic powder is substantially wholly coated with said synthetic resin; and said magnetic powder being magnetized in a vertical direction so that vertical magnetic poles are established in said magnetic float.

4. A magnetic float according to claim 3, wherein said magnetic float has a surface density of magnetic flux of about 60 to 160 Gauss and a bulk specific gravity as low as 0.7 to 0.85.

5. A magnetic float according to claim 4, wherein said magnetic powder comprises an anisotropic magnetic material.

6. A magnetic float according to claim 4, wherein said magnetic powder comprises an isotropic magnetic material.

7. A magnetic float according to claim 4, wherein said magnetic powder comprises a rare earth metal.

* * * * *